United States Patent [19]

Patmore

[11] Patent Number: 5,762,307
[45] Date of Patent: Jun. 9, 1998

[54] RETRACTABLE AUTOMOTIVE CUPHOLDER FOR COMPACT STORAGE IN AN INTERIOR STORAGE COMPARTMENT

[75] Inventor: Kevin M. Patmore, Northville, Mich.

[73] Assignee: Irvin Automotive Products, Auburn Hills, Mass.

[21] Appl. No.: 652,311

[22] Filed: May 23, 1996

[51] Int. Cl.⁶ .................................................. A47C 7/68
[52] U.S. Cl. .................. 248/311.2; 297/188.16; 297/188.19; 224/926
[58] Field of Search ................ 297/188.16, 188, 297/17, 188.19; 248/311.2; 224/926

[56] References Cited

U.S. PATENT DOCUMENTS

| | | |
|---|---|---|
| 2,778,702 | 1/1957 | Franks . |
| 4,040,659 | 8/1977 | Arnold . |
| 4,728,018 | 3/1988 | Parker . |
| 4,928,865 | 5/1990 | Lorence . |
| 4,953,771 | 9/1990 | Fischer et al. . |
| 5,007,610 | 4/1991 | Christiansenn et al. . |
| 5,060,899 | 10/1991 | Lorence et al. ................ 297/188.17 X |
| 5,072,989 | 12/1991 | Spykerman et al. . |
| 5,096,152 | 3/1992 | Christiansen et al. . |
| 5,104,185 | 4/1992 | Christiansen et al. ............ 297/188.16 |
| 5,131,716 | 7/1992 | Kwasnik et al. .................... 297/188.16 |
| 5,190,259 | 3/1993 | Okazaki .......................... 297/188.19 X |
| 5,195,711 | 3/1993 | Miller et al. . |
| 5,284,314 | 2/1994 | Misaras et al. ................ 297/188.17 X |
| 5,318,343 | 6/1994 | Spykerman et al. . |
| 5,330,146 | 7/1994 | Spykerman .................... 297/188.17 X |
| 5,524,958 | 6/1996 | Wieczorek et al. ................ 297/186.17 |
| 5,556,017 | 9/1996 | Troy ................................. 297/188.16 X |
| 5,601,269 | 2/1997 | Jankovic ......................... 297/188.17 X |
| 5,628,486 | 5/1997 | Rossman et al. ............... 297/188.19 X |

FOREIGN PATENT DOCUMENTS

| | | |
|---|---|---|
| 0716241 | 4/1986 | European Pat. Off. . |
| 581401 | 5/1932 | Germany . |
| 4022193A1 | 1/1992 | Germany . |
| 53-116940 | 9/1978 | Japan . |
| 53-154538 | 12/1978 | Japan . |
| 57-164821 | 4/1981 | Japan . |
| 57-138433 | 8/1982 | Japan . |

*Primary Examiner*—Derek J. Berger
*Assistant Examiner*—Donald J. Wallace
*Attorney, Agent, or Firm*—Harness, Dickey & Pierce P.L.C.

[57] ABSTRACT

A cupholder assembly for mounting within a recess of a storage compartment in a motor vehicle and being moveable between a stored position within the recess and a use position outside of the recess. The cupholder assembly includes a housing which supports a pair of arms that at least partially defining an aperture for receiving a container. A pivot mounting movably mounts the arms to the housing so that the arms are moveable between laterally outward positions defining a first width and length and laterally inward positions defining a second width and length. The pivot mounting a common pivot axis, about which both arms pivot, as well as second and third pivot axes. The common pivot axis and the second and third pivot axes are all moveable relative to said support housing thereby providing for the reduced length and width of the assembly in the laterally inward position.

19 Claims, 6 Drawing Sheets

RETRACTABLE AUTOMOTIVE CUPHOLDER FOR COMPACT STORAGE IN AN INTERIOR STORAGE COMPARTMENT

BACKGROUND OF THE INVENTION

1. Field of the Invention

The present invention relates to an assembly for holding and supporting at least one beverage container within a motor vehicle. Specifically, this invention relates to a cupholder assembly constructed to fit within a vehicle arm rest and adapted to pivot from a storage position within the arm rest to a use position outside of the arm rest where it can support one or more beverage containers.

2. Description of the Related Art

When traveling, a person often finds it desirable to have a beverage in the vehicle. The beverage might have been brought from one's house or purchased from a convenient "drive-thru" location. Regardless of where the beverage originates, the beverage can be in any one of a variety of containers, such as a cup, mug, bottle or can, and that all of these can greatly vary in size and shape. Without a place to securely hold the beverage container, movement of the vehicle can easily result in the container being knocked over and its contents spilled, especially when the container is placed on the vehicle dash, floor, seat or center console. For obvious reasons, it is desirable to provide a stable cupholder for beverage containers when they are used in a vehicle.

Numerous types of mechanisms have been developed to prevent a beverage container from being knocked over and spilling its contents during normal movement of the vehicle. Perhaps the simplest of these is the "travel mug". Travel mugs generally come in two varieties. The first variety has a narrow opening and a wide base. This combination lowers the center of gravity of the mug and prevents tipping during traveling. The second variety of travel mug includes a lid with and small opening and often a flanged bottom adapted to secure the mug in a base that has been previously mounted on top of the vehicle dash or center console. Both of the above varieties of travel mugs are limited since they require the use of a specific container and, in the latter case, a dedicated vehicle having the base mounted in it. For these reasons, the travel mugs can be inconvenient.

An alternative to a travel mug is a "universal" cupholder which is attached to or built into the vehicle. These cupholders are generally designed so that they are capable of receiving and supporting a variety of types and sizes of containers. The simplest in-vehicle cupholder is a one-piece plastic "hanger" which includes a downwardly extending tab that, during use, is positioned so it extends into the window opening between the glass and the interior of the door. These cupholders have drawbacks in that they are bulky, easily broken, and sometimes interfere with turning of the vehicle's steering wheel or the opening of the door. A somewhat similar design is built into the vehicle and includes a supportive base that folds down and operates as a tray onto which the container can be placed.

Vehicle manufacturers and their vendors have developed other types of cupholders which are part of the original equipment mounted in the vehicle. These cupholders are retractable into concealed locations when not in use. One style includes a tray that is mounted so that it can slide into a recess in the dash board or other part of the vehicle. These sliding tray cupholders include one or more fixed apertures into which the beverage container can be received. A similar type of cupholder includes a pivoting tray. With the pivoting tray cupholder, the tray pivots from a "stored"0 non-horizontal position to a "use" position, in response to opening of an associated cover or door. The door might also operate as the bottom support for the beverage container when the container is received within the aperture of the tray.

As instrument panels have become increasingly crowded with electronic, climate control and other equipment, trays with fixed circular apertures have been viewed as occupying too much space. In an effort to reduce their size, numerous assemblies have been developed where one or more of the receiving arms defines the aperture in which the container is received. The receiving arm is often mounted to a sliding tray and the arms pivot laterally outward under the influence of a biasing force. In some designs, the receiving arm only defines the outboard portion of the container receiving aperture and the inner side of the container receiving aperture is defined by the tray itself. While more complicated than a fixed ring cupholder, these movable arm-type assemblies allow the cupholder to occupy less space when stored and, therefore, they are preferred.

Cupholders have also been incorporated into locations within the vehicle other than the dashboard. Because even a compact cupholder will occupy a relatively large amount of space, one location which has received considerable attention for this purpose is the center arm rest or console (of a vehicle with bucket seats).

Generally, the cupholders which have been incorporated into the center arm rest or console (hereinafter just "arm rests") fall into two general types. The first type is similar to the drawer-style mentioned above and slides into a recess defined in the arm rest. In order to hold at least two containers, whose combined width is greater than the width of a standard arm rest, the cupholder includes features which allow the receiving arms to occupy a reduced width when the cupholder is in its non-use position. In accomplishing this, cupholders have been proposed where each container receiving aperture is partly defined by the movable arm and partly by the fixed support or drawer. The arms laterally pivot relative to the drawer as the drawer is withdrawn from the recess in the arm rest. When the cupholder is being closed, the arms engage or "wipe" against the sides of the opening in the arm rest causing them to be pushed laterally inward where they occupy a reduced width. Generally, the arms form an outboard curved portion which cooperates with a correspondingly curved inboard recess in the drawer so that, when the arms are fully extended, the beverage container receiving aperture is defined by the two.

In the second type, the cupholder pivots about a transverse horizontal axis from a stored position, within the arm rest, into a use position outside of the arm rest. This variety of cupholder is typically used where the arm rest also doubles as a storage compartment and is provided with a hinged lid. This design however is often bulky and occupies a significant portion of the storage compartment. Obviously, when the cupholder is to be incorporated into the storage recess of an arm rest, it is important for the cupholder to occupy as little space as possible when in the stored position. Not only is this important in terms of the width of the collapsed cupholder, but also in terms of the cupholder's length. As seen from the above and other limitations of the related art, there still exists a need in the industry for an arm rest mounted cupholder assembly which incorporates a compact design both in terms of its collapsed width and length. The present invention fulfills that need.

Accordingly, it is an object of the present invention to provide a cupholder assembly having a construction which is compact in terms of collapsed length and width and which is mounted so as to pivot out of the arm rest of the vehicle.

A feature of this invention is that the arms defining the container receiving apertures of the cupholder are provided with sliding pivots that enable a reduction in the width and length occupied by the cupholder when collapsed.

Another feature of the present invention is that the cupholder pivots about two axes, further enhancing its compact design.

It is also an object of this invention to provide a cupholder whose arms automatically retract as the cupholder is moved into its stored position.

Another object of this invention is to provide a cupholder in which each beverage container receiving aperture is wholly defined by one annular element, thereby offering an increased amount of stability to the cupholder.

A further object of this invention is to provide a cupholder of the above mentioned variety where those portions defining the container receiving aperture are configured to readily accept beverage containers with handles, such as coffee mugs.

SUMMARY OF THE INVENTION

In achieving the above and other objects, the present invention provides a cupholder assembly which is adapted to pivot into and out of a storage compartment recess defined in the vehicle arm rest. When in its stored position, the present cupholder assembly is concealed the vehicle arm rest and occupies the forward end of the storage compartment leaving the rearward portion of the compartment free for storage. In its use position, the cup-holding portion of the assembly is extended forward of the arm rest.

As it is rotated out of the storage compartment, a cup-holding portion of the assembly is lifted and moved forward, along a generally arcuate path, by a pair of carrier which pivot about a horizontal, transverse axis. The cup-holding portion of the assembly also pivots relative to the carrier.

As the cup-holding portion is moved from its use position into its stored position, the cup-holding portion will swing into the storage recess of the arm rest. This movement is used to push a pair of arms, which include ring elements defining the container receiving apertures, laterally inward into a reduced width position. More particularly, the arms slidingly engage the inside walls of the storage recess and this causes the arms to be pushed laterally inward and toward one another. The arms are each outwardly biased by a spring element so that when not constrained, they tend to move to their outward position. When the cupholder assembly of the present invention is moved from its stored position into its use position, the arms automatically spring laterally outwardly to positions where a beverage container can be received within the ring elements of each. The ring elements completely define the container receiving apertures. In this respect, the ring elements are circumferentially continuous.

In addition to moving laterally inward, the arms are each mounted in such a way that as they move laterally inward, the axis about which they pivot moves laterally outward. The effect of the movement of the pivot results in the arm and ring element being capable of occupying a reduced length when in the collapsed position. In this manner, the cupholder assembly of the present invention is capable of occupying less space in the storage recess then would be otherwise possible.

As more fully discussed below, the ring elements of the arms include a downwardly extending offset in their outboard side portions. The offsets are configured to receive the handle of a coffee cup or similar beverage container. The offsets are also positioned so the handle of a coffee cup can be easily reached by a person within the vehicle. Additionally, the ring elements of the arms are each vertically offset from the other so that when stored, one ring element and arm will partially overlap the other, further contributing to the compactness of the design.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
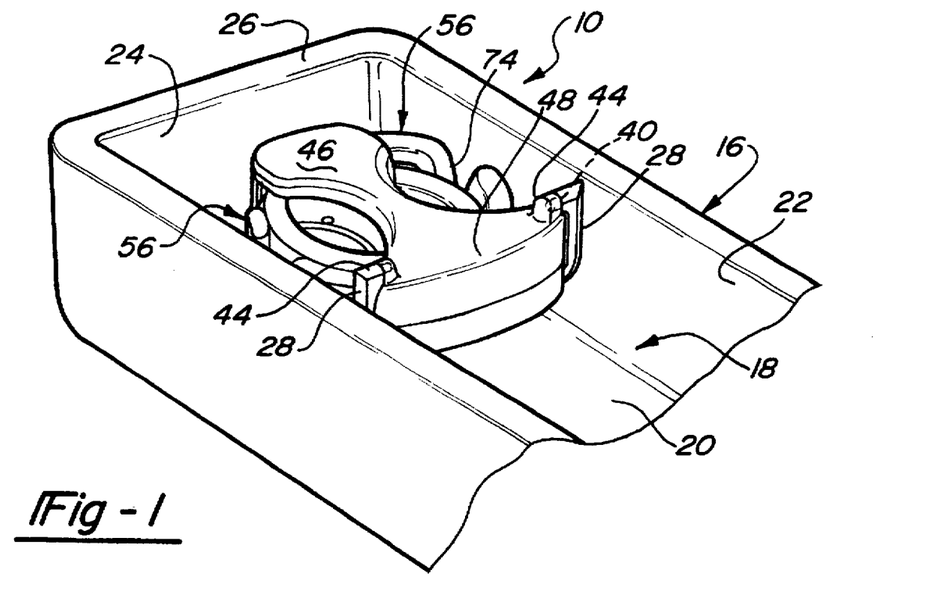
FIG. 1 is a perspective view of an arm rest based cupholder assembly embodying the principles of the present invention illustrating the cupholder assembly in its stored position.

Referring now to the drawings, a cupholder assembly incorporating the principles of the present invention is generally illustrated in FIG. 1 and designated at 10. As seen in the preferred embodiment, the cupholder assembly 10 principally includes two portions, a cup holding portion 12 and a carrier portion 14. While illustrated and particularly described in connection with an automobile arm rest 16, it will be readily apparent to a person skilled in the art that the cupholder assembly 10 is capable of being incorporated into various other compartments of an automobile, other vehicle or container. Such alternative locations and uses for the cupholder assembly 10 are therefore deemed well to be within the purview of this invention.

Figure 2:
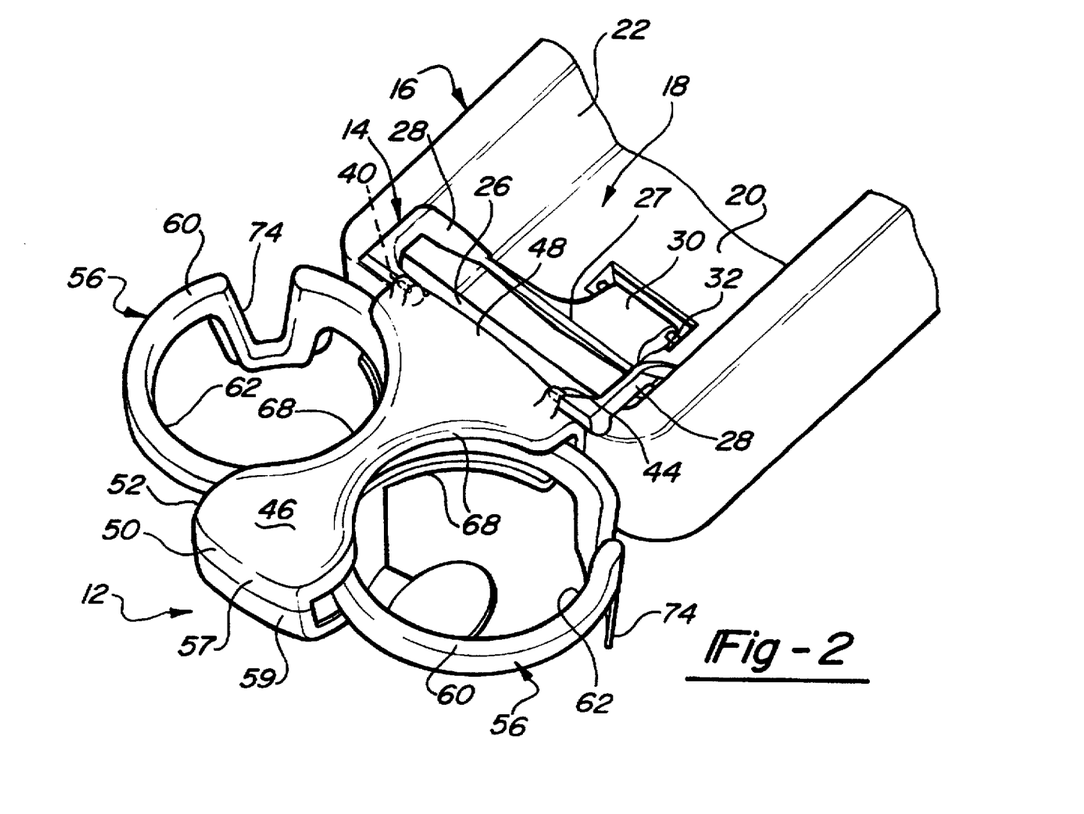
FIG. 2 is a front quartering perspective view of the cupholder assembly of FIG. 1 being shown in its use position.

The cupholder assembly 10 is integrally formed or mounted to the arm rest 16 for movement between a retracted or stored position, seen in FIG. 1, and an extended or use position, seen in FIG. 2. In its retracted position, the cup-holding portion 12 is located at the forward end of a storage compartment recess 18 defined in the arm rest 16. In its extended position, the cup holding portion 12 of the assembly 10 is positioned longitudinally forward of the arm rest 16 and held there by the carrier portion 14.

The storage compartment 18 of the arm rest 16 is defined by a bottom wall 20, upwardly extending sidewalls 22, and upwardly extending end walls, of which only the forward end wall 24 is illustrated. The arm rest 16 is also provided with a top wall or lid (not shown) that is connected to the rear end wall by a hinge. With the top wall in its up position, as generally represented in the figures, the cupholder assembly 10 of the present invention can be moved from its stored position to its use position and vice versa.

Figure 3:
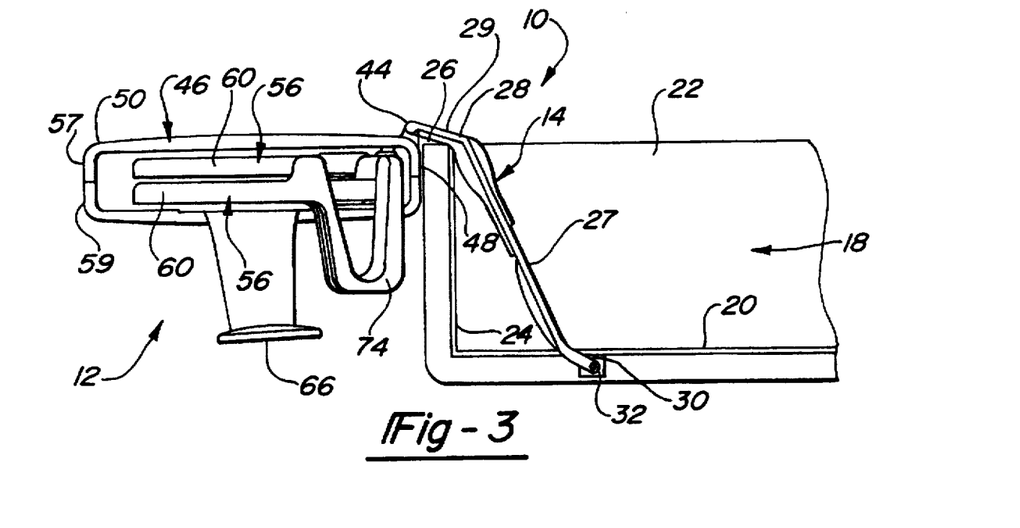
FIGS. 3–7 are side elevational views of the cupholder assembly of FIG. 1 showing the sequential movement of the assembly from its use position to its stored position.

Referring now to FIG. 1, in its stored position, the cupholder assembly 10 compactly occupies the fowardmost portion of the storage compartment 18 in the arm rest 16 leaving the remaining portions available for storage. In moving the cup-holding portion 12 from its use position to its stored position, the cup-holding portion 12 is lifted upward and rearward over the upper periphery 26 of the forward wall 24, as schematically illustrated in FIGS. 3–7. In its use position, as best seen in FIGS. 2 and 3, the cup-holding portion 12 of the assembly 10 is located in front of the forward end wall 24.

The carrier portion 14 includes a yoke 27 having a pair of laterally spaced carrier arms 28 at its upper end 29. At its lower end 30, the yoke 27 includes a pivot mounting means which is secured to the bottom wall 20 in a continuous manner for pivoting about an axis defined through pins 32. The carrier arms 28 are spaced apart approximately the width of the storage compartment 18. The location of the engagement of the pins 32 with the bottom wall 20 is spaced a lateral distance from the forward end wall 24. This helps to reduce the "forward throw" or distance which the cup-holding portion 12 is moved out of the arm rest 16.

Extending upward from the pins 32, the yoke 27 and carrier arms 28 are angularly oriented or canted with respect to one another, providing the arms 28 with a "dog leg" shape. This helps to enable the assembly to only occupy a minimal amount of forward end space in the storage compartment as further described below. Additionally, the carrier arms 28 are provided with a flat, lower surface which will lay flat against and on the upper periphery 26 of the forward wall 24 when the assembly 10 is in its use position. The purpose of this is also more fully set out below.

The cup-holding portion 12 is pivotally attached to the carrier portion 14. The upper ends of the carrier arms 28 terminate laterally inwardly in directed pins 40. The pins 40 provide the pivotal attachment point for the carrier portion 14 to the cup-holding portion 12 such that the cup-holding portion 12 pivots about an axis 43 extending through the pins 40. As illustrated in FIG. 1, the pins 40 are received in corresponding openings extending laterally outward within a pair of bosses 44 located adjacent the rear edge 48 of the cup-holding portion 12.

The cup-holding portion 12 includes a support housing or shelf 46 that supports the other structures of this portion 12. As best seen in FIG. 2, the shelf 46 has a rear edge 48, a front edge 50, and opposing side edges 52.

When the cup-holding portion 12 in its use position, a spring element laterally biases a pair of container receiving arms 56 outward from an over-lapping, stored position between upper 57 and lower 59 halves of the shelf 46. Various constructions can be provided for the receiving arms 56 and the general construction described herein is only intended to be illustrative of one of the many possible. The specific construction of the preferred embodiment of the receiving arms 56 is further discussed below.

Generally, the container receiving arms 56 pivot about vertical axes and are biased laterally outward by a spring. Forward of the axes, ring elements 60 are unitarily formed in the arms 56. The ring elements 60 are generally circular in shape and completely define an aperture 62 into which a beverage container, such as a coffee cup, is to be received. The ring element 60 is further provided with a "droop" or vertical offset 74 on its outboard side and this is intended to accommodate the handle of the coffee cup or other beverage container. When a container is received within the aperture 62, the container rests upon and is supported by a tray 66. The tray 66 is integrally and rigidly formed with the lower half 59 of the shelf 46. Other possible construction for the tray 66 include those where the tray or bail pivots relative to the shelf 46 under the influences of gravity.

If desired, a snubber (not shown) formed from a resilient, preferably closed cell foam material can be mounted to the shelf 46 so as to also extend into the vertical cylinder generally defined by the aperture 62. The snubber accommodates beverage containers which have a diameter substantially less than that of the aperture 62. Thus, the snubber "snugs-up" the fit between the beverage container and aperture 62.

The shelf 46 is formed with two semi-circular recesses 68 along its side edges 52. The recesses 68 cooperate with the ring elements 60 when they are in their use position and in this manner they reduce the lateral distance which the ring elements 60 must be biased in order to clear the shelf 46 and accept a container. The recesses 68 in the illustrated embodiment do not, however, define the apertures 62.

By generally reviewing FIG. 2, it will be noted that the overall width defined by the receiving arms 56 in their use position is greater than the width defined by either the carrier arms 28 or the storage compartment 18. When being moved into its stored position from its use position, the arms 56 of the cup-holding portion 12 must laterally retract to a reduced width. This is accomplished by the interaction and contacting of the cup-holding portion 12 with the sidewalls 22 of the storage compartment recess 18.

The cup-holding portion 12 is mounted to the upper ends 29 of the carrier arms 28 so as to be pivotable about the axis 43 as mentioned above. During movement into its stored position, the cup-holding portion 12 pivots about the axis 43 and swings between the sidewalls 22 of the storage compartment 18. While swinging between the sidewalls 22, the ring elements 60 contact the sidewalls 22 in a sliding engagement and are forced laterally inward against the biasing force of the spring. Continued swinging of the cup-holding portion 12 further moves the ring elements 60 into a configuration where the maximum width defined by the ring elements 60 is approximately the same as the width between the sidewalls 22. As a result, cupholder assembly 10 is received within the storage compartment 18.

Referring to FIGS. 3–7, the movements of the cup-holding portion 12 and carrier portion 14 during the positioning of the assembly 10 into its stored position will now be described.

Figure 4:
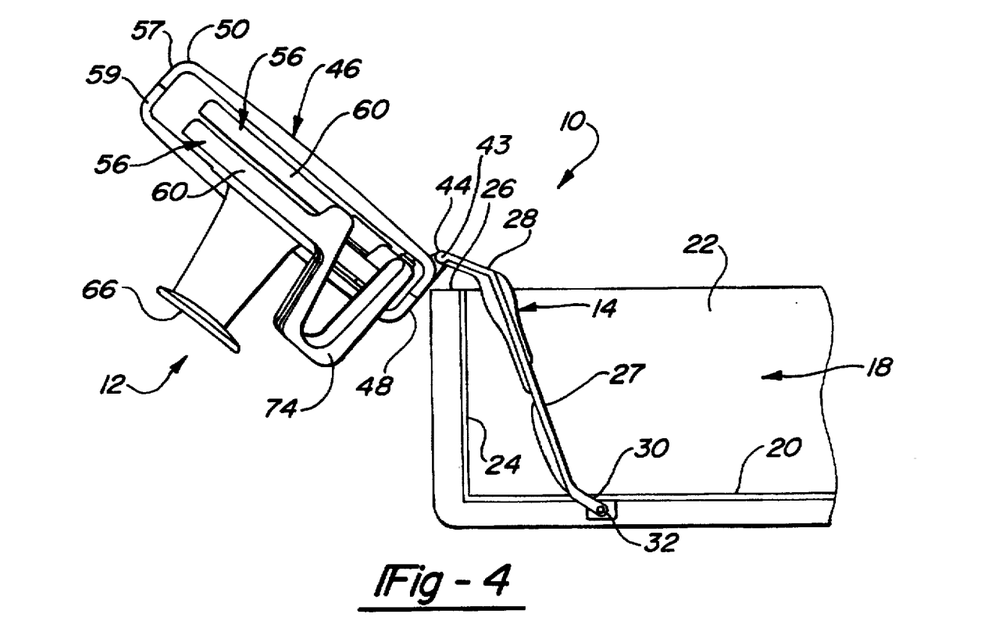
Figure 5:
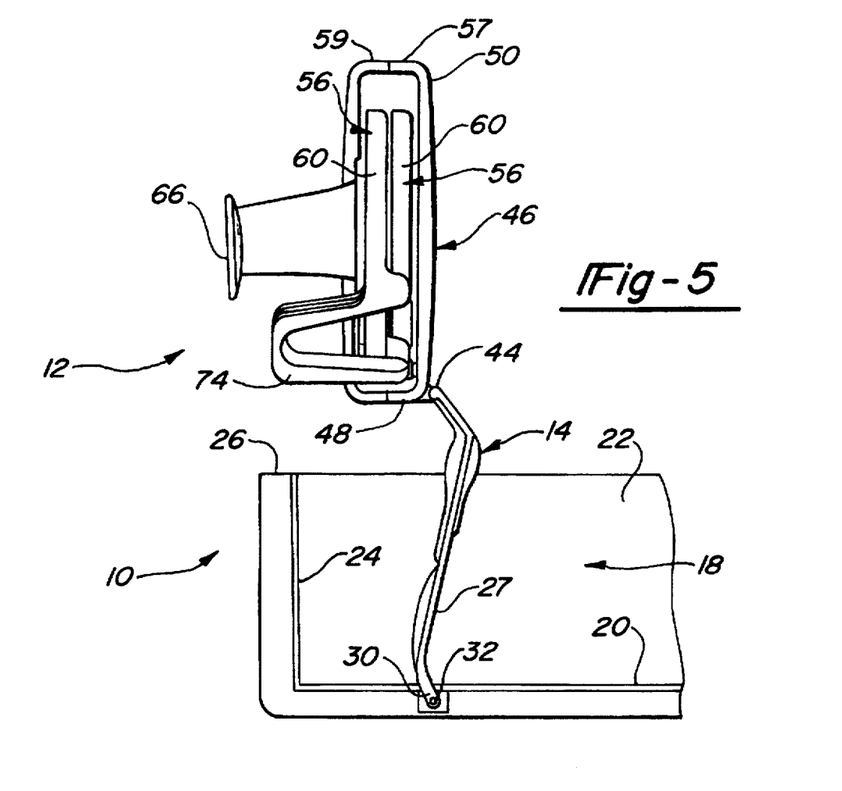
Figure 6:
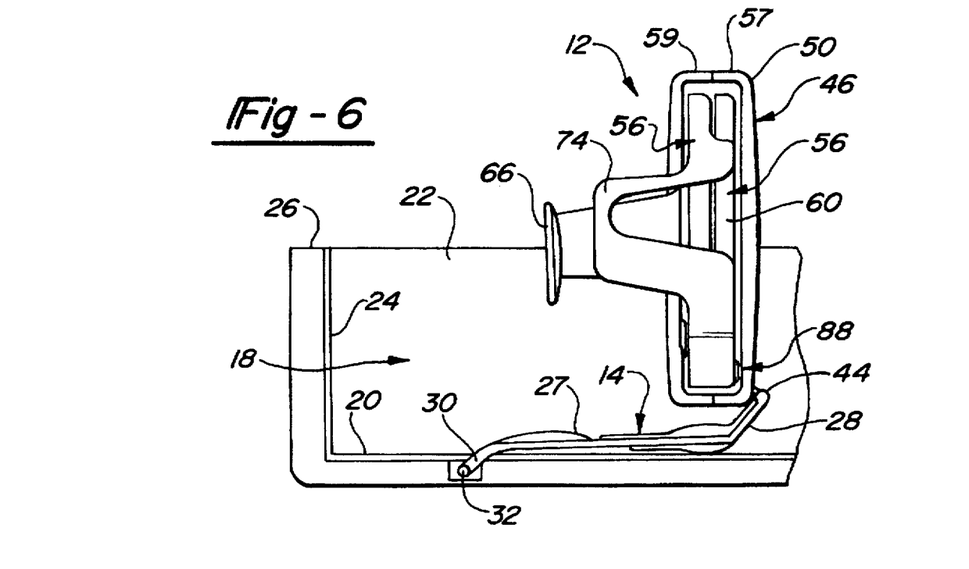
Figure 7:
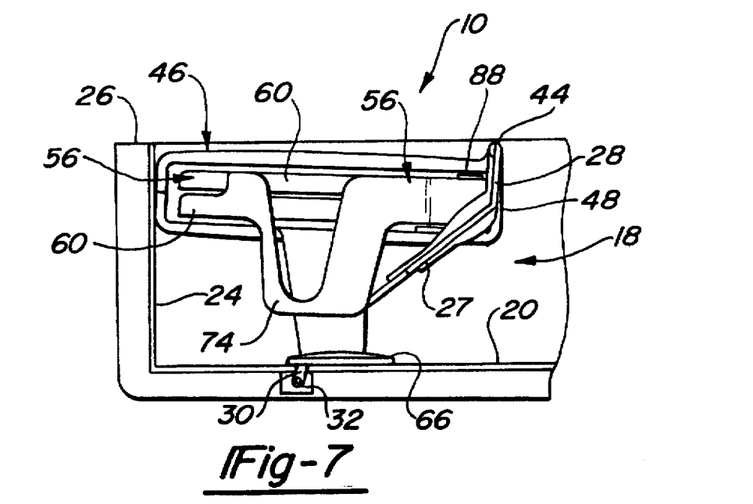

As seen in FIGS. 3 and 4, by initially lifting up on the forward edge 50 of the cupholder portion 12, the cupholder portion 12 is raised the yoke 27 begins to pivot about the axis defined by the pins 32. The cupholder portion 12 also pivots about the pins 40 of the carrier arm, allowing the cupholder portion 12 to raise above the upper periphery 26 of the storage compartment 18. Further rotation of the yoke about the axis through the pins 32 causes the cup-holding portion 12 to be moved rearward of the forward wall 24 of the storage compartment 18. As the carrier arm 28 moves past a vertical position relative to the pins 32, the cupholder portion 12 is in initially brought down into the storage compartment 18. During movement into the storage compartment, the ring elements 60 engage the sidewalls 22 of the storage compartment. Further movement of the cupholder portion 12 into the storage compartment 18 causes the container receiving arms 56 to be biased laterally inward into an overlapping position as can be identified in FIG. 1. It has been found that the arms collapse easiest when the cupholder portion 12 is brought into the position shown in FIG. 6 and then subsequently rotated forward into position shown in FIG. 7 which raises the yoke 27 and moves the cupholder portion 12 into a forward position adjacent to the front of the cavity and the storage compartment 18. In this manner, the cupholder portion 12 occupies a minimum amount of space in the storage compartment 18.

Figure 8:
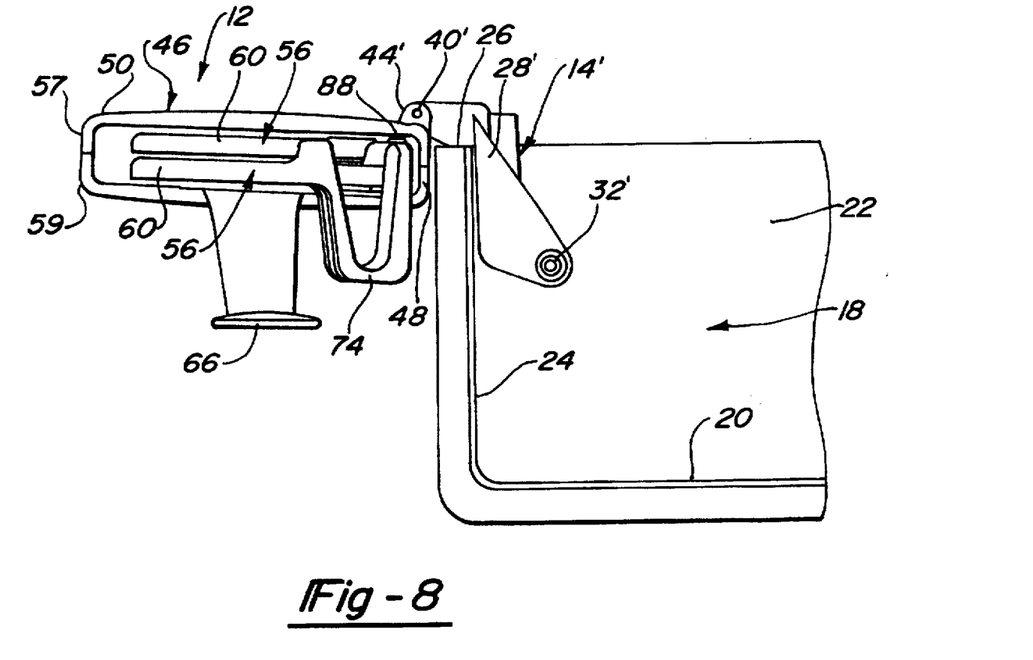
FIGS. 8–10 are side elevational views of a second embodiment of a cupholder assembly according to the principles of the present invention and illustrate the sequential movement of the assembly from its use position to its stored position.
Figure 9:
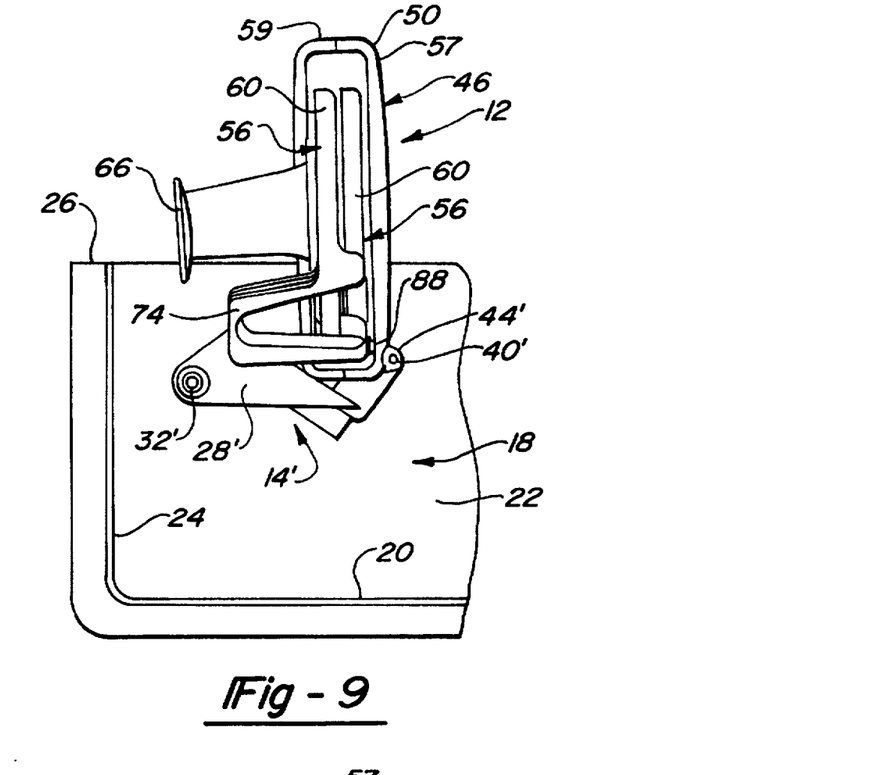
Figure 10:
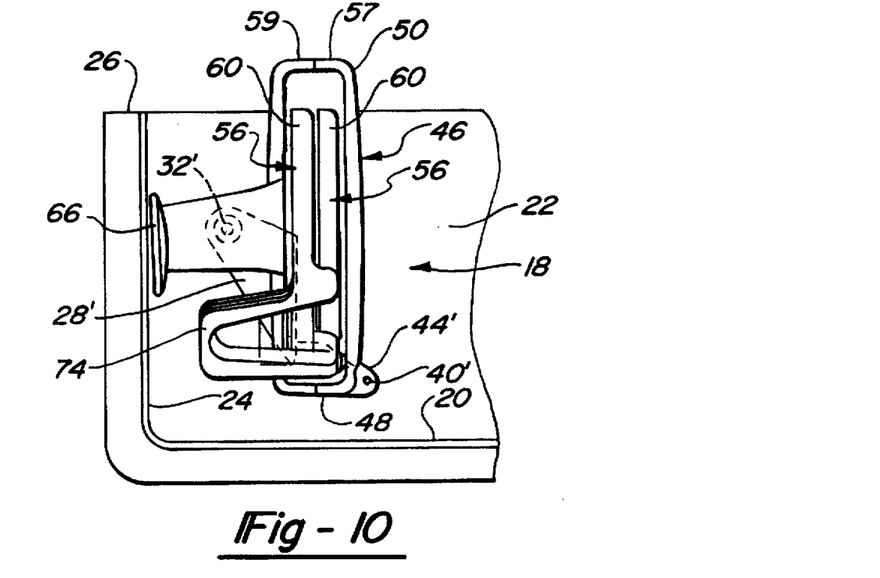
Figure 11:
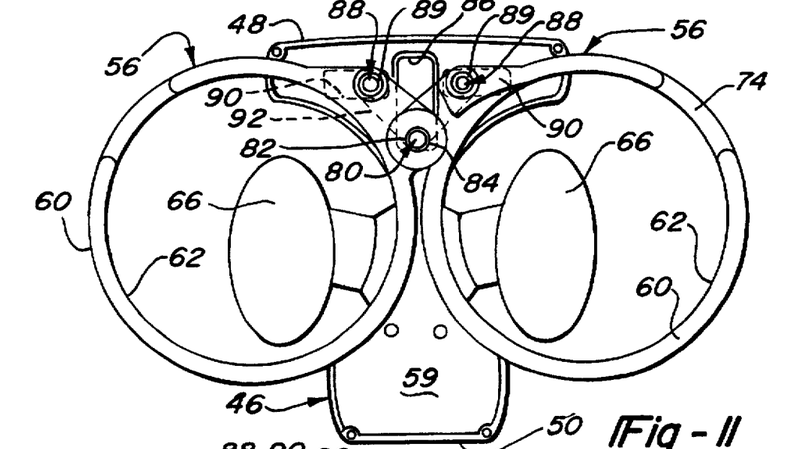
FIG. 11 is a top plan view with portions removed showing the cupholder portion of the present invention and the relative pivot axis of the arms and ring elements.
Figures 12, 13:
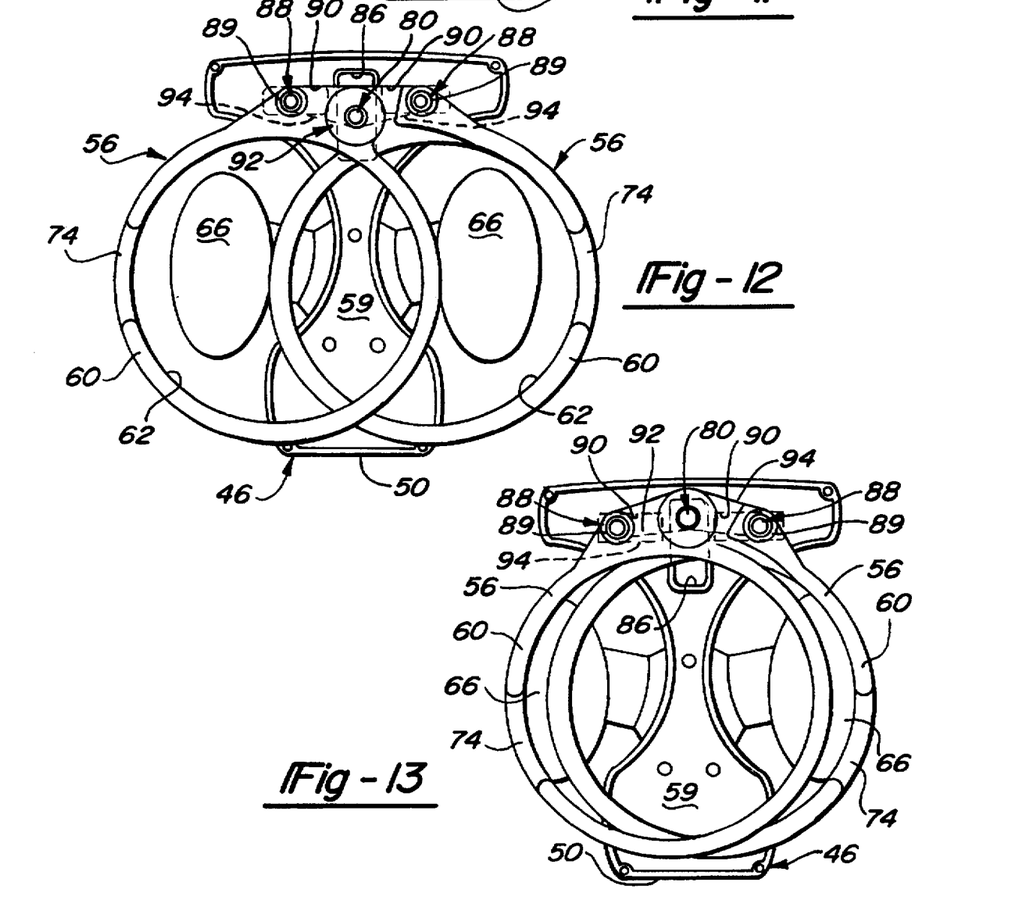
FIGS. 12 and 13 are top plan views of the cupholder portion seen in FIG. 10 illustrating the movement of the pivot axes during collapsing of the arms and ring elements to their stored positions.

A second embodiment of the present invention is illustrated in FIGS. 8–10. As with the prior embodiment, the cupholder portion 12 is pivotally supported by carrier arms 28' which include pins 40' that are received in bosses 44' defined on the rear edge 48 of the cupholder portion 12. The carrier arms 28' are configured to pivotally engage the sidewalls 22 of the storage compartment 18 through a pin 32' extending into the sidewall 22'. As with the prior embodiment, the cupholder portion 12 is brought down into the storage compartment 18 most easily when in a generally vertical orientation as seen in FIG. 9. However, unlike the first embodiment, this latter embodiment is not rotated forward. Rather, the carrier arms continue to be rotated in the same direction with the cupholder portion in its vertical orientation until the cup-holding portion is brought forward into the position seen in FIG. 10. In this manner, the cup-holding portion only occupies a minimum amount of space in the forward end of the storage compartment 18. Except for its engagement with the carrier portion 14 and 14', the cupholder portion 12 used in the first and second embodiment are identical. Referring now to FIGS. 11–13, the mechanism which allows for the collapsing of the arms 56 will now be described in greater detail.

Referring now to FIGS. 11–13, the cupholder assembly 10 of the present invention incorporates a novel configuration for mounting the carrier arms 28 to each other and the shelf 46. In particular, a three pivot construction with each pivot being slidable or movable relative to the shelf 46, is utilized as the pivot mounting means.

The two container receiving arms 56 are interconnected with each other so as to be moveable relative to one another about a central pivot 80 generally located along a medial line through shelf 46. The pivot 80 is defined by a post 82, integrally formed with the topmost of the receiving arms 56, and a post receiving aperture 84 defined in the lower of the two receiving arms 56. The post 82 extends completely through the aperture 84 of the lower receiving arm 56 and is received in a slot 86 formed in the lower half 59 of the shelf 46. The slot 86 extends longitudinally between the rear 48 and front 50 edges of the shelf 46.

Similarly, each container receiving arm 56 includes a post portion spaced apart from the common pivot 80. These post portions 89 extend downward from the container receiving arms 56 and are received in slots 90 defined in the lower half 59 of the shelf 46. These slots 90 are generally adjacent to the rear edge 48 of the shelf 46 and extend laterally with respect to the shelf 46. As seen in the figures in the preferred embodiment, the slot 86 is located so as to be positioned between a plane generally defined by the two slots 90, with all three slots 86 and 90 being located generally toward the rearward edge 48 of the shelf 46.

A torsion spring 92 interacts between the pivots 80 and 88. In the illustrated embodiment, the torsion spring is provided such that the post 82 of the common pivot 80 extends through the central coil section of the spring 92 with the two extending leg portions 94 of the spring 92 bearing against the generally outward and forward side of the posts 89 of the pivots 88. The spring 92 is biased so that when unconstrained, the spring moves the posts 89 of the container receiving arms 56 laterally inward within the slots 90 and generally toward the slot 86. As a result, the carrier arms 56 are in their outward position. As the posts 89 are moved laterally inward by the spring 92, the forces exerted by the spring 92 also act to move the pivot 80 toward the forward edge 50 of the shelf 46. During collapsing of the carrier arms, the pivot 80 is moved in the slot 86 generally rearward toward the rear edge 48 of the shelf 46. This action results in the pivots 88 each being moved within the slots 90 laterally outward. In the preferred embodiment, pivot 80 is capable of moving over center relative to the pivots 88 and in this position, the carrier arms 56 are in their fully collapsed position.

As a result of the three pivot construction and their relative movements to each other, the cup-holding portion 12 is capable of exhibiting both a reduced effective length and width configuration when collapsed. The length is reduced relative to that which would be exhibited if the arms 56 pivoted about a fixed pivot axis common to both of the container receiving arms 56. This allows for a maximization of the diameter defined by the apertures 62 of the container receiving arms 56 while minimizing the length of the cup-holding portion 12 when the arms 56 are collapsed. These length considerations are of particular concern where the cupholder assembly 10 is being incorporated into an arm rest in either a horizontal or vertical orientation as illustrated herein. By reducing the length of the cup-holding portion 12, the vertical height of the arm rest, as seen in FIG. 10, can be reduced. Similarly by reducing the collapsed length of the assembly 10, the cup-holding portion 12 can be made to occupy a minimum amount of space within the storage compartment recess of the arm rest.

While the above description constitutes the preferred embodiment of the present invention, it will be appreciated that the invention is susceptible to modification, variation and change without departing from the proper scope and fair meaning of the accompanying claims.

I claim:

1. A cupholder assembly adapted for mounting within a recess of a storage compartment in a motor vehicle and being moveable between a stored position within the recess and a use position outside of the recess, said cupholder assembly comprising:

a support housing having a front edge, a rear edge and opposing side edges extending longitudinally between said front and rear edges;

at least one arm supported by said support housing, said arm including portions at least partially defining an aperture for receiving a container therein;

pivot mounting means for movably mounting said arm to said support housing, said mounting means defining at least two pivot axes and said arm being rotatable about said pivot axes between a laterally outward position defining a first width and a laterally inward position defining a second width, said second width being less than said first width, said pivot axes being moveable with respect to said support housing such that said arm defines a reduced effective length in said laterally inward position relative to an effective length which would otherwise be defined by said arm if said pivot axes were immoveable with respect to said support housing, said effective lengths being measured from a forwardmost portion of said arm when in said laterally outward and laterally inward positions to the location of one of said pivot axes when said arm is in said laterally outward position;

biasing means for biasing said arm into said laterally outward position; and carrier means for movably supporting said support housing relative to the recess.

2. A cupholder assembly as set forth in claim 1 wherein one of said pivot axes moves laterally with respect to said support housing.

3. A cupholder assembly as set forth in claim 1 wherein one of said pivot axes moves longitudinally with respect to said support housing.

4. A cupholder assembly as set forth in claim 1 wherein said pivot axes are defined by pivot members formed on said arm, each said pivot member being slidably received in a slot defined in said support housing.

5. A cupholder assembly as set forth in claim 4 wherein one of said slots is laterally oriented with respect to said support housing.

6. A cupholder assembly as set forth in claim 4 wherein one of said slots is longitudinally oriented with respect to said support housing.

7. A cupholder assembly as set forth in claim 1 wherein said assembly is horizontally oriented when received in the recess of the storage compartment.

8. A cupholder assembly as set forth in claim 1 wherein said assembly is vertically oriented when received in the recess of the storage compartment.

9. A cupholder assembly adapted for mounting within a recess of a storage compartment in a motor vehicle and being moveable between a stored position within the recess and a use position outside of the recess, said cupholder assembly comprising:

a support housing having a front edge, a rear edge and opposing side edges extending longitudinally between said front and rear edges;

carrier means for movably supporting said support housing relative to the recess, said carrier means movably supporting said support housing for movement between said stored and use positions;

a pair of arms supported by said support housing, said arms each including portions at least partially defining an aperture for receiving a container therein;

pivot mounting means for movably mounting said arms to said support housing, said mounting means defining a common pivot axis, said common pivot axis being moveable with respect to said support housing, said mounting means further defining second and third pivot axes, one of said arms being rotatable about said second pivot axis and the other of said arms being pivotable about said third pivot axis, said second and third pivot axes also being moveable relative to said support housing, said arms being rotatable about said common, second and third pivot axes between laterally outward positions defining a first width and length and laterally inward positions defining a second width and length, said second width being less than said first width, said second length being less than a length which would be defined if said common pivot axis was immoveable relative to said support housing; and biasing means for biasing said arms into said laterally outward positions.

10. A cupholder assembly as set forth in claim 9 wherein said common pivot axis is longitudinally moveable with respect to said support housing.

11. A cupholder assembly as set forth in claim 9 wherein said second and third pivot axes are laterally moveable with respect to said support housing.

12. A cupholder assembly as set forth in claim 9 wherein said common pivot axis is longitudinally moveable with respect to said support housing and said second and third pivot axes are laterally moveable with respect to said support housing.

13. A cupholder assembly as set forth in claim 9 wherein said second and third pivot axes are positioned on opposite sides of a plane defined through said common pivot axis.

14. A cupholder assembly as set forth in claim 9 wherein said common pivot axis is moveable through a plane defined through said second and third axes.

15. A cupholder assembly as set forth in claim 9 wherein said second and third pivot axis are generally moveable within a common plane.

16. A cupholder assembly as set forth in claim 9 wherein movement of said common pivot is generally transverse to movement of second and third pivot axes.

17. A cupholder assembly as set forth in claim 9 wherein said biasing means is a torsion spring positioned about said common pivot axis.

18. A cupholder assembly as set forth in claim 17 wherein said torsion spring includes a pair of spring arms, one of said spring arms generally engaging a portion of said mounting means defining said second and third pivot axes so as to bias said arms laterally outward.

19. A cupholder assembly as set forth in claim 9 wherein said arms automatically collapse into said laterally inward position upon movement of said cupholder assembly from said use position into said stored position.

* * * * *